US012721272B2

(12) United States Patent
Li et al.

(10) Patent No.: US 12,721,272 B2
(45) Date of Patent: Sep. 1, 2026

(54) JUJUBE HARVESTING APPARATUS WITH ADJUSTABLE SUCTION VECTOR AND METHOD THEREFOR

(71) Applicant: Shihezi University, Shihezi City (CN)

(72) Inventors: Jingbin Li, Shihezi City (CN); Yang Li, Shihezi City (CN); Jing Nie, Shihezi City (CN); Longpeng Ding, Shihezi City (CN); Xianfei Wang, Shihezi City (CN); Xuewei Chao, Shihezi City (CN); Hongwei Li, Shihezi City (CN); Yichen Yuan, Shihezi (CN); Jiashun Jiang, Shihezi City (CN); Changguo Liu, Shihezi City (CN); Jiguo Chen, Shihezi City (CN); Yi Wang, Shihezi City (CN)

(73) Assignee: Shihezi University, Shihezi (CN)

( * ) Notice: Subject to any disclaimer, the term of this patent is extended or adjusted under 35 U.S.C. 154(b) by 275 days.

(21) Appl. No.: 18/761,804

(22) Filed: Jul. 2, 2024

(65) Prior Publication Data

US 2025/0017144 A1 Jan. 16, 2025

(30) Foreign Application Priority Data

Jul. 12, 2023 (CN) ........................ 202310856425.1

(51) Int. Cl.
*A01D 46/00* (2006.01)

(52) U.S. Cl.
CPC ................................. *A01D 46/005* (2013.01)

(58) Field of Classification Search
CPC ........ A01D 46/005; A01D 51/00; Y02P 60/12
See application file for complete search history.

(56) References Cited

U.S. PATENT DOCUMENTS

2018/0249634 A1 9/2018 Morris et al.

FOREIGN PATENT DOCUMENTS

CN 206932690 U 1/2018
CN 207151237 U * 3/2018 ............ A01D 51/00
CN 108668638 A * 10/2018 ............ A01D 51/00

(Continued)

OTHER PUBLICATIONS

Luo Jin-gang, et al., "Kinematics Analysis of Picking Mechanism of Air-Blowing Red Jujube Picker", Apr. 7, 2017, 4 Pages.

(Continued)

*Primary Examiner* — Arpad Fabian-Kovacs
(74) *Attorney, Agent, or Firm* — Maier & Maier, PLLC

(57) ABSTRACT

A jujube harvesting apparatus with adjustable suction vector includes: an air duct assembly, where one end of which is arranged with an air duct inlet; a wind power device arranged on one end of the air duct assembly deviating from the air duct inlet and connected to the air duct assembly, where the wind power device is used for generating wind power; an ionization device arranged on the air duct assembly and positioned between the air duct inlet and the wind power device, where the ionization device is used for ionizing air in the air duct assembly to generate plasma; a magnetic field generating device including a first strip-shaped permanent magnet and a second strip-shaped permanent magnet; and a suction vector adjustable device including two moving assemblies, two rotating assemblies, an electromagnetic sensor component, and a control module.

10 Claims, 4 Drawing Sheets

(56) References Cited

FOREIGN PATENT DOCUMENTS

| | | | | | |
|---|---|---|---|---|---|
| CN | 108848899 | A | * | 11/2018 | ........... A01D 46/005 |
| CN | 110287600 | A | | 9/2019 | |
| CN | 111642235 | A | * | 9/2020 | ........... B07B 13/072 |
| CN | 112058665 | A | * | 12/2020 | .............. B07B 9/00 |
| CN | 213073636 | U | * | 4/2021 | ............. A01D 51/00 |
| CN | 114847004 | A | * | 8/2022 | ............. A01D 46/28 |
| CN | 110287600 | B | * | 4/2023 | ........... G06F 30/203 |
| CN | 116171725 | A | * | 5/2023 | ............. A01D 46/04 |
| CN | 116616046 | A | * | 8/2023 | ............. A01D 46/30 |
| CN | 116649095 | A | * | 8/2023 | ............. A01D 51/00 |
| CN | 117242982 | A | * | 12/2023 | ........... A01D 46/005 |
| CN | 120402404 | A | * | 8/2025 | ........... F04D 29/057 |
| EP | 2281432 | A1 | * | 2/2011 | ............. A01D 45/00 |
| EP | 2281433 | A1 | * | 2/2011 | ........... A01D 46/005 |
| KR | 20230170850 | A | * | 12/2023 | ............. A01D 46/26 |
| KR | 20250129250 | A | * | 8/2025 | ............. B65G 47/91 |
| WO | WO-9203910 | A1 | * | 3/1992 | ........... A01D 46/243 |
| WO | WO-2009043333 | A2 | * | 4/2009 | .............. F25B 19/00 |
| WO | WO-2014035273 | A2 | * | 3/2014 | ........... A01D 46/005 |

OTHER PUBLICATIONS

120368, Li YW. Fan H. Zhang BL, et al. "Test and numerical simulation research on magneto-hydrodynamic clow control with none quilibrium ionization", Acta Aeronautica et Astronautica Sinica, 2017, 10 pages.

Wang, et al., "P85—High-efficiency harvesting of jujube by air suction harvester: suction pipe gas MHD acceleration control", ECPA2023—Unleashing the Potential of Precision Agriculture—Book of Abstract, 2 pages.

* cited by examiner

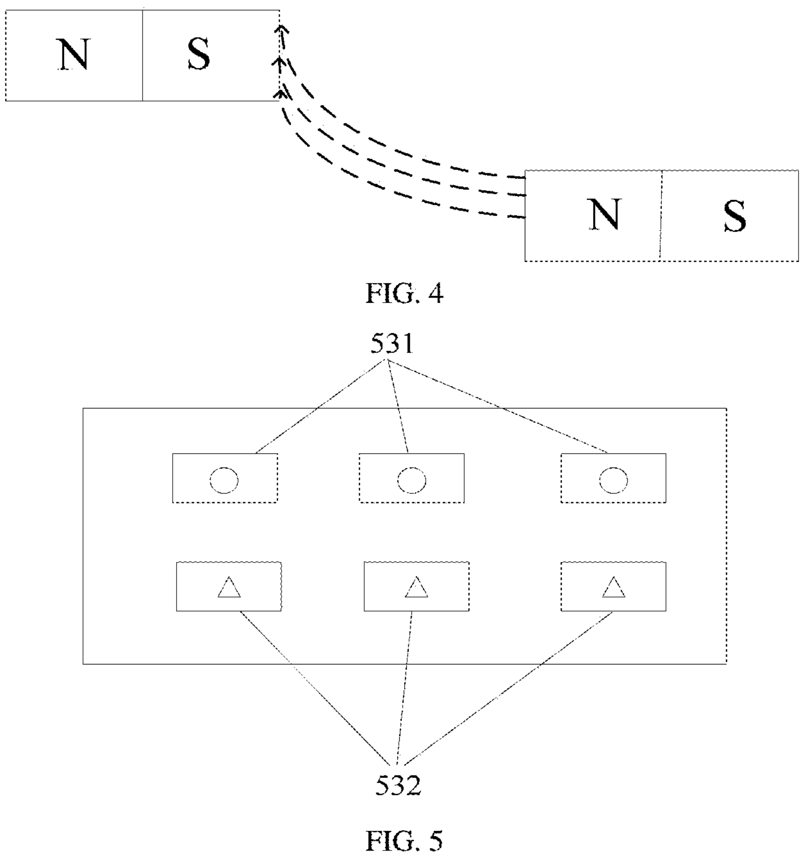
FIG. 4
FIG. 5
PDE
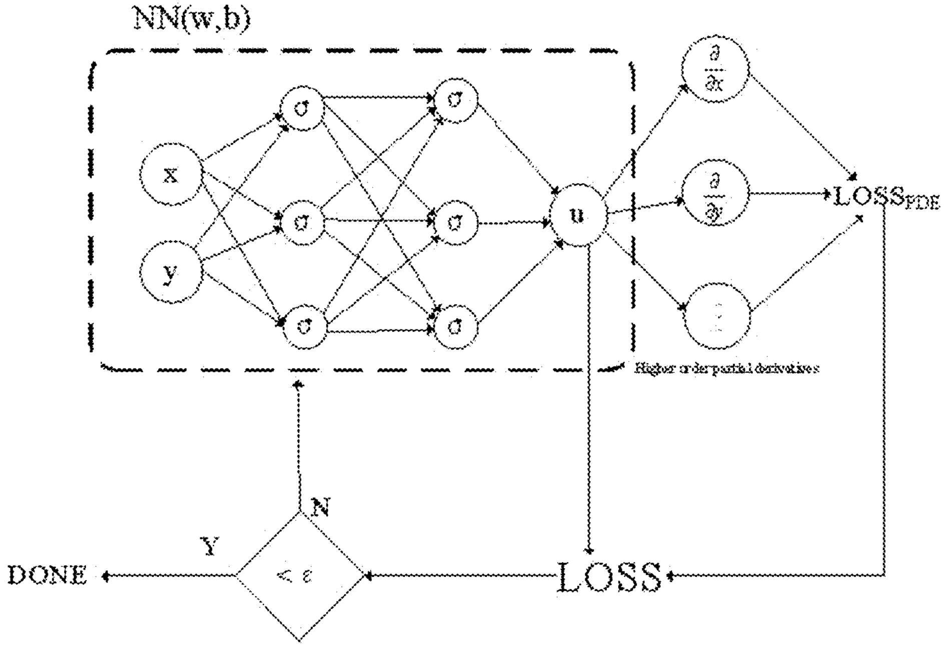
FIG. 6

JUJUBE HARVESTING APPARATUS WITH ADJUSTABLE SUCTION VECTOR AND METHOD THEREFOR

CROSS-REFERENCE TO RELATED APPLICATIONS

This application claims priority to Chinese Patent Application No. 202310856425.1, filed on Jul. 12, 2023, the content of all of which is incorporated herein by reference.

FIELD

The present disclosure relates to the technical field of agricultural machines, in particular to a jujube harvesting apparatus with adjustable suction vector and method therefor.

BACKGROUND

In China's jujube producing areas, the planting methods of jujubes are mainly dwarf and low-density planting. It is necessary to wait until the jujubes are fully mature and naturally fall off from jujube trees before harvesting jujubes with good appearance and quality. Because jujubes are dwarf and densely planted, the traditional method for collecting landing jujubes is mainly manual picking, which has low collection efficiency, high cost and long collection time.

In order to solve the above problems, air-suction jujube harvesting technology is invented, which uses an air compressor to generate suction inside an air-suction straw, and the landing jujubes enter the air-suction straw after the suction, and finally fall into a jujube collecting box, so as to complete the collection of the landing jujubes. Compared with manual picking, the harvesting efficiency of the device is significantly improved and the harvesting time is significantly reduced.

However, although the air-suction jujube harvesting technology can improve the harvesting efficiency and shorten the harvesting time, it also faces certain problems and dilemmas, especially in suction control. Due to the comprehensive influence of the length and size of a suction pipe and the power of the air compressor, the air consumption loss of the suction pipe of the air-suction jujube harvesting technology is large, the suction output is insufficient, the suction control is difficult, and the jujube picking efficiency is limited. When the suction of the air compressor is too large, too many jujubes are enter the pipeline in a short time, which easily cause problems such as pipeline blockage, jujube collision and crushing. When the suction is too small, the jujube harvesting efficiency is extremely low, which seriously affects the jujube harvesting period and causes the jujubes to rot and deteriorate in the field.

Therefore, solving the problem of suction control in air-suction jujube harvesting technology has become the top priority to improve the efficiency and benefit of jujube harvesting industry.

SUMMARY

To solve the technical problems, in a first aspect, the present disclosure provides a jujube harvesting apparatus with adjustable suction vector, including:

An air duct assembly, one end of the air duct assembly includes an air duct inlet;

A wind power device, the wind power device is arranged on one end of the air duct assembly deviating from the air duct inlet and is connected to the air duct assembly, and the wind power device is used for generating wind power;

An ionization device, the ionization device is arranged on the air duct assembly and positioned between the air duct inlet and the wind power device, and the ionization device is used for ionizing air in the air duct assembly to generate plasma;

A magnetic field generating device, the magnetic field generating device comprises a first strip-shaped permanent magnet and a second strip-shaped permanent magnet; and A suction vector adjusting device, the suction vector adjusting device comprises two moving assemblies, two rotating assemblies, an electromagnetic sensor component, and a control module, the two moving assemblies are respectively arranged on the air duct assembly and located at two sides of the ionization device, the two rotating assemblies are arranged at a driving end of the moving assembly and are slidably arranged on the moving assembly by driving force of the driving end of the moving assembly, the first strip-shaped permanent magnet and the second strip-shaped permanent magnet are respectively arranged on a driving end of the rotating assembly and are rotatably arranged on the rotating assembly by the driving end of the rotating assembly, the electromagnetic sensor assembly is used for acquiring electromagnetic field parameters and is arranged on an inner wall of the air duct assembly and located at the ionization device, and the control module is respectively connected with the wind power device, the ionization device, the two moving assemblies, the two rotating assemblies, and the electromagnetic sensor assembly.

According to the jujube harvesting apparatus with adjustable suction vector, further including a collection box; the collection box is arranged on one end of the air duct assembly deviating from the air duct inlet and is connected to the air duct assembly, and the wind power device is arranged on one end of the collection box deviating from the air duct assembly and is connected to the collection box.

According to the jujube harvesting apparatus with adjustable suction vector, the wind power device further includes an air compressor and a filter screen; the air compressor is arranged on the one end of the collection box deviating from the air duct assembly and is connected to the collection box, and the filter screen is arranged between the air compressor and the collection box.

According to the jujube harvesting apparatus with adjustable suction vector, the ionization device includes a discharge electrode assembly and a power supply assembly; the discharge electrode assembly is arranged on the air duct assembly and is used for ionizing air in the air duct assembly to generate plasma, and the power supply assembly is connected to the discharge electrode assembly and is used for supplying electric energy to the discharge electrode assembly.

According to the jujube harvesting apparatus with adjustable suction vector, a first ionization region is arranged on an upper surface of the air duct and a second ionization region is arranged on a lower surface of the air duct, the discharge electrode assembly includes a plurality of positive electrodes and a plurality of negative electrodes, the plurality of the positive electrodes are arranged on the first ionization region, the plurality of the negative electrodes are arranged on the second ionization region and are arranged in parallel and symmetrically with the positive electrodes, the power supply assembly comprises a plurality of high-voltage nanosecond pulse power supplies, and the positive electrodes and the negative electrodes are respectively connected with positive poles and negative poles of the corresponding high-voltage nanosecond pulse power supply.

According to the jujube harvesting apparatus with adjustable suction vector, the two moving components include a first guide rail, a second guide rail, a first servo motor, and a second servo motor, the first guide rail is arranged on the air duct assembly and is located on one side of the ionization device, the first servo motor is arranged on the first guide rail, the first strip-shaped permanent magnet is arranged on a driving end of the first servo motor, the second guide rail is arranged on the air duct assembly and is located on another side of the ionization device, the first guide rail and the second guide rail are arranged in parallel, the second servo motor is arranged on the second guide rail, and the second strip-shaped permanent magnet is arranged on a driving end of the second servo motor.

According to the jujube harvesting apparatus with adjustable suction vector, the two rotating components include a first rotating table and a second rotating table, the first rotating table is arranged on the driving end of the first servo motor and slidably arranged on the first guide rail by the driving end of the first servo motor, the first strip-shaped permanent magnet is arranged on a driving end of the first rotating table, the second rotating table is arranged on the driving end of the second servo motor and is slidably arranged on the second guide rail by the driving end of the second servo motor, and the second strip-shaped permanent magnet is arranged on the second rotating table.

According to the jujube harvesting apparatus with adjustable suction vector, the two rotating components further include a first tray and a second tray, the first tray is fixedly arranged on the driving end of the first rotating table, the first strip-shaped permanent magnet is arranged on the first tray, the second tray is fixedly arranged on the driving end of the second rotating table, and the second strip-shaped permanent magnet is arranged on the second tray.

According to the jujube harvesting apparatus with adjustable suction vector, the electromagnetic sensor assembly includes a plurality of conductivity sensors and a plurality of magnetic field strength sensors, the plurality of conductivity sensors are sequentially arranged on an inner side wall of the air duct assembly located at the ionization device at intervals and are used for detecting electric field parameters inside the air duct assembly, the plurality of the magnetic field intensity sensors are sequentially arranged on the inner side wall of the air duct assembly located in the ionization device at intervals and are located below the conductivity sensor, and the magnetic field intensity sensors are used for detecting magnetic field parameters inside the air duct assembly.

In a second aspect, one embodiment of the present disclosure provides a jujube harvesting method with adjustable suction vector, the method is applied to the jujube harvesting apparatus with adjustable suction vector; the method includes:

- Aiming an air duct inlet at jujubes, and sucking the jujubes into an air duct assembly under an action of wind power and ampere force;
- Obtaining initial electromagnetic field parameters, and determining optimal electromagnetic field parameters according to the initial electromagnetic field parameters, jujube harvesting efficiency, and jujube integrity; and
- Determining movement data of a moving assembly and rotation data of a rotating assembly according to a differential value between the optimal electromagnetic field parameters and the initial electromagnetic field parameters, and determining a distance, an angle, and a magnetic pole direction between a first strip-shaped permanent magnet and a second strip-shaped permanent magnet according to the movement data and the rotation data, so as to obtain suction with better jujube harvesting efficiency and jujube integrity, wherein the suction is combined force of the wind power and the ampere force.

The embodiments of the present disclosure at least have following beneficial effects:

In the present disclosure, the air inside the air duct assembly is ionized by the ionization device to generate a plasma plume flow, and the charged particles in the plasma plume flow move directionally to generate current. The magnetic field generating device controls the current to generate ampere force in the same direction or opposite direction to the wind or forming a certain angle with the wind direction inside the air duct assembly, and under the action of the suction force formed by the combined force of the wind power (generated by the wind power device) and the ampere force, the landing jujubes are sucked into the air duct assembly. Meanwhile, the electromagnetic field parameters inside the air duct assembly are detected by the electromagnetic sensor assembly and transmitted into the control module. According to the current electromagnetic field parameters in combination with the jujube harvesting efficiency and the jujube integrity, the control module performs physical field coupling calculation to determine optimal electromagnetic field parameters. According to values of the optimal electromagnetic field parameters and values of the current electromagnetic field parameters detected by the current electromagnetic sensor assembly, a displacement data of the moving assembly and a rotation data of the rotating assembly are determined to adjust a distance, an angle and a magnetic pole direction between the first strip-shaped permanent magnet and the second strip-shaped permanent magnet, so as to change a distribution of magnetic induction lines and a magnitude and a direction of magnetic field intensity between the first strip-shaped permanent magnet and the second strip-shaped permanent magnet. Thereby a magnitude and direction of the ampere force is changed, that is, the magnitude and direction of the suction force (the resultant force of the ampere force and the wind power) is changed, and finally obtaining the suction force which can simultaneously ensure the jujube harvesting efficiency and the jujube integrity (or obtaining the best jujube harvesting efficiency on the premise of ensuring the jujube integrity). It should be understood that the components of the embodiment can be adjusted according to the environmental changes (wind power changes, etc.) in real time, so as to always obtain better electromagnetic field parameters, thus obtaining better suction vector.

BRIEF DESCRIPTION OF THE DRAWINGS

In order to make the technical schemes of the embodiments of the present disclosure clearer, the attached drawings in the embodiments of the present disclosure or the prior art are briefly described here. Obviously, the described attached drawings are only a part of the embodiments of the present disclosure. Those skilled in the art with no inventive labor can obtain other attached drawings according to the present drawings.

FIG. 4 is a schematic diagram of a magnetic field distribution of a first strip-shaped permanent magnet and a second strip permanent magnet in the jujube harvesting apparatus with adjustable suction vector in one embodiment of the present disclosure.

FIG. 5 is a schematic diagram of a connection structure between an electromagnetic sensor assembly and an air duct in the jujube harvesting apparatus with adjustable suction vector in one embodiment of the present disclosure.

FIG. 6 is a schematic diagram of a physical information neural network in the jujube harvesting apparatus with adjustable suction vector in one embodiment of the present disclosure.

DETAILED DESCRIPTION OF EMBODIMENTS

In order to make the technical problems to be solved, technical schemes and beneficial effects in the present disclosure more clear and definite, the present disclosure is further explained in detail with the attached drawings and embodiments. It should be understood that the specific embodiments described herein are only used to explain the present disclosure, and are not used to limit the present disclosure.

It is worth noting that when a component is said to be "fixed" or "arranged" to another component, it can be directly or indirectly located on the other component, when a component is said to be "connected" to another component, it can be directly or indirectly connected to the other component. The directions or positions indicated by the terms "up", "down", "left", "right", "front", "rear", "vertical", "horizontal", "top", "bottom", "inner", "outer", etc. are based on the directions or positions shown in the attached drawings, and are only for the convenience of description, and cannot be understood as references to the present technical schemes. The terms "first" and "second" are only used for convenience of description, and cannot be understood as indicating or implying relative importance or implicitly indicating the quantity of technical features. The meaning of "plurality" is two or more, unless otherwise specifically defined.

The present disclosure is further described in detail below with reference to the accompanying drawings.

Figure 1:
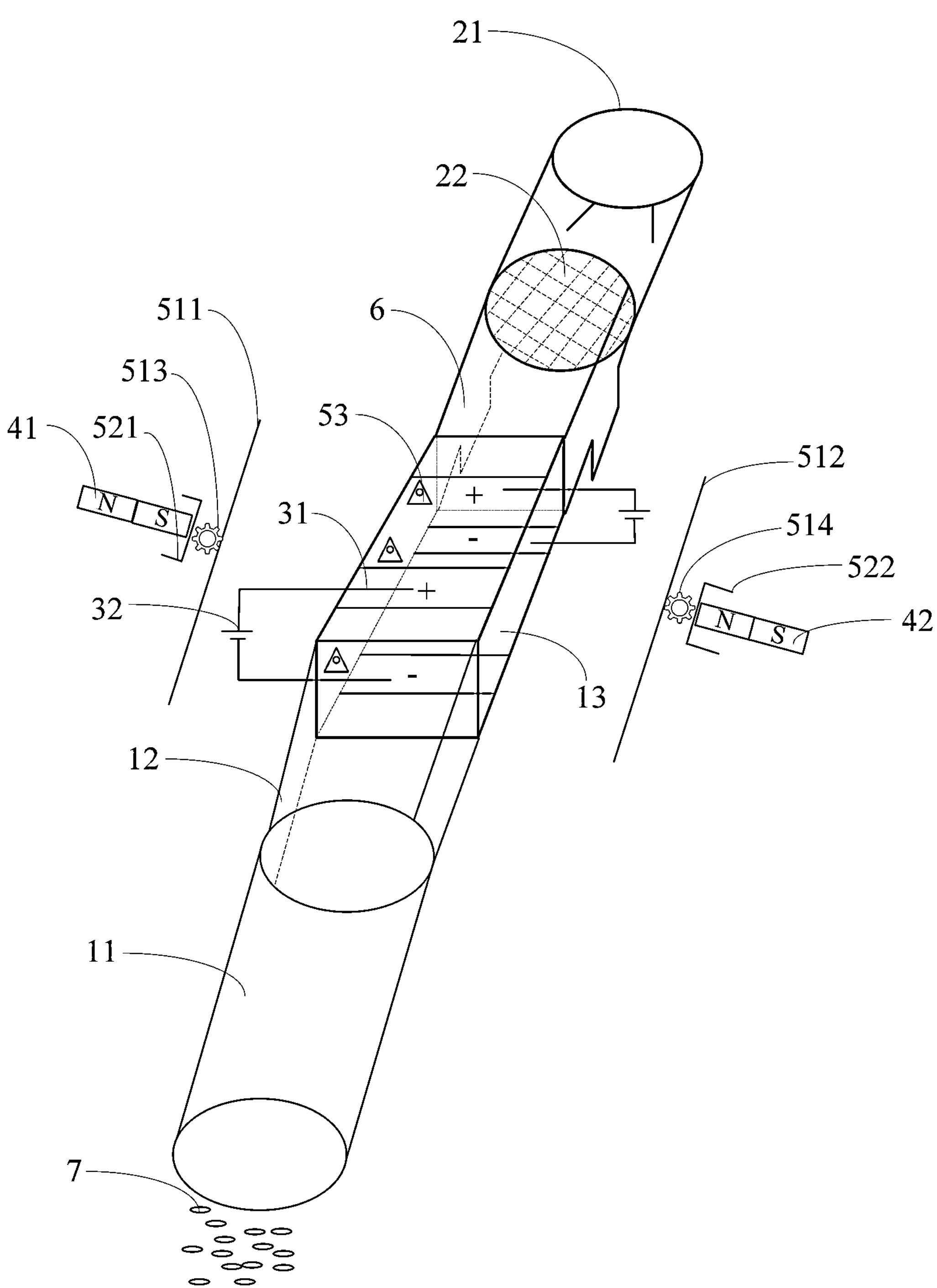
FIG. 1 is a schematic diagram of an overall structure of a jujube harvesting apparatus with adjustable suction vector in one embodiment of the present disclosure.

As shown in FIG. 1, in a first aspect, the present disclosure provides a jujube harvesting apparatus with adjustable suction vector, including an air duct assembly, a wind power device, an ionization device, a magnetic field generating device and a suction vector adjusting device.

Among them, the wind power device is arranged on one end of the air duct assembly deviating from an air duct inlet and is connected to the air duct assembly, and is used for generating wind power. The ionization device is arranged on the air duct assembly and positioned between the air duct inlet and the wind power device and is used for ionizing the air in the air duct assembly to generate plasma. The magnetic field generating device includes a first strip-shaped permanent magnet 41 and a second strip-shaped permanent magnet 42. The suction vector adjusting device includes two moving assemblies, two rotating assemblies, an electromagnetic sensor assembly 53, and a control module (not shown in the drawings). The two moving assemblies are respectively arranged on the air duct assembly and located at two sides of the ionization device. The rotating assembly is arranged at a driving end of the moving assembly and is slidably arranged on the moving assembly by a driving force of the driving end of the moving assembly. The first strip-shaped permanent magnet 41 and the second strip-shaped permanent magnet 42 are respectively arranged on a driving end of the rotating assembly and are rotatably arranged on the rotating assembly by the driving end of the rotating assembly. The electromagnetic sensor assembly 53 is used for acquiring electromagnetic field parameters and is arranged on an inner wall of the air duct assembly and located at the ionization device. The control module is respectively connected with the wind power device, the ionization device, the two moving assemblies, the two rotating assemblies and the electromagnetic sensor assembly 53.

In one embodiment, the air inside the air duct assembly is ionized by the ionization device to generate a plasma plume flow, and the charged particles in the plasma plume flow move directionally to generate current. The magnetic field generating device controls the current to generate ampere force in the same direction or opposite direction to the wind or forming a certain angle with the wind direction inside the air duct assembly, and under the action of the suction force formed by the combined force of the wind power (generated by the wind power device) and the ampere force, the landing jujubes 7 are sucked into the air duct assembly. Meanwhile, the electromagnetic field parameters inside the air duct assembly are detected by the electromagnetic sensor assembly 53 and transmitted into the control module. According to the current electromagnetic field parameters in combination with the jujube harvesting efficiency and the jujube integrity, the control module performs physical field coupling calculation to determine optimal electromagnetic field parameters. According to values of the optimal electromagnetic field parameters and values of the current electromagnetic field parameters detected by the current electromagnetic sensor assembly 53, displacement data of the moving assembly and rotation data of the rotating assembly are determined to adjust a distance, an angle, and a magnetic pole direction between the first strip-shaped permanent magnet 41 and the second strip-shaped permanent magnet 42, so as to change a distribution of magnetic induction lines and a magnitude and a direction of magnetic field intensity between the first strip-shaped permanent magnet 41 and the second strip-shaped permanent magnet 42. Thereby a magnitude and direction of the ampere force is changed, that is, the magnitude and direction of the suction force (the resultant force of the ampere force and the wind power) is changed, and finally obtaining the suction force which can simultaneously ensure the jujube harvesting efficiency and the jujube integrity (or obtaining the best jujube harvesting efficiency on the premise of ensuring the jujube integrity). It should be understood that the components of the embodiment can be adjusted according to the environmental changes (wind power changes, etc.) in real time, so as to always obtain better electromagnetic field parameters, thus obtaining better suction vector.

Figure 3:
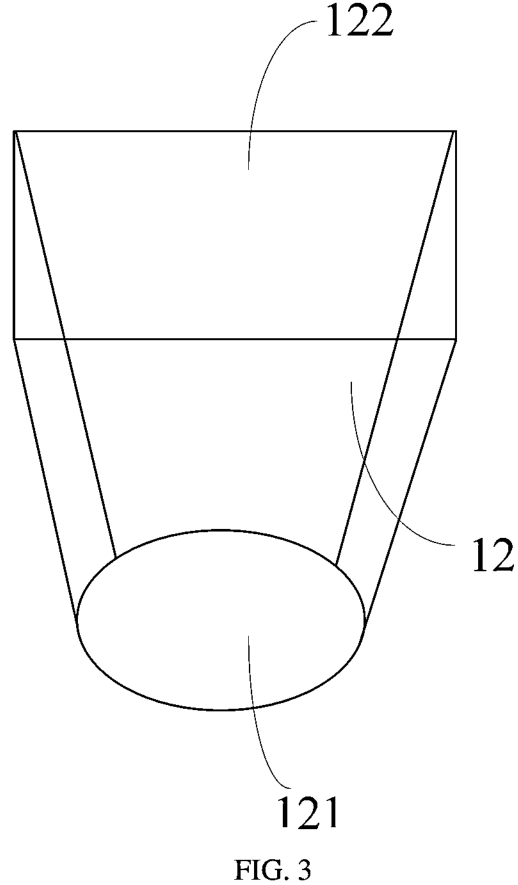
FIG. 3 is a schematic structural diagram of an adapter of the jujube harvesting apparatus with adjustable suction vector in one embodiment of the present disclosure.

Optionally, as shown in FIGS. 1 and 3, the air duct assembly includes a suction pipe 11, an adapter 12, and an air duct 13 which are sequentially connected; the suction pipe 11 is a flexible suction pipe with a suction pipe inlet and a suction pipe outlet; the suction pipe inlet is arranged at one end of the suction pipe 11 close to the landing jujubes 7, the suction pipe outlet is arranged at one end of the suction pipe 11 deviating from the landing jujubes 7, and the adapter 12 has a transfer inlet 121 and a transfer outlet 122. The transfer inlet 121 is circular, the transfer inlet 121 of the adapter 12 is connected to the suction pipe inlet. The transfer outlet 122 is rectangular. The air duct 13 is a rectangular body with an air duct inlet and an air duct outlet, and the air duct inlet of the air duct 13 is connected to the transfer outlet 122.

Figure 2:
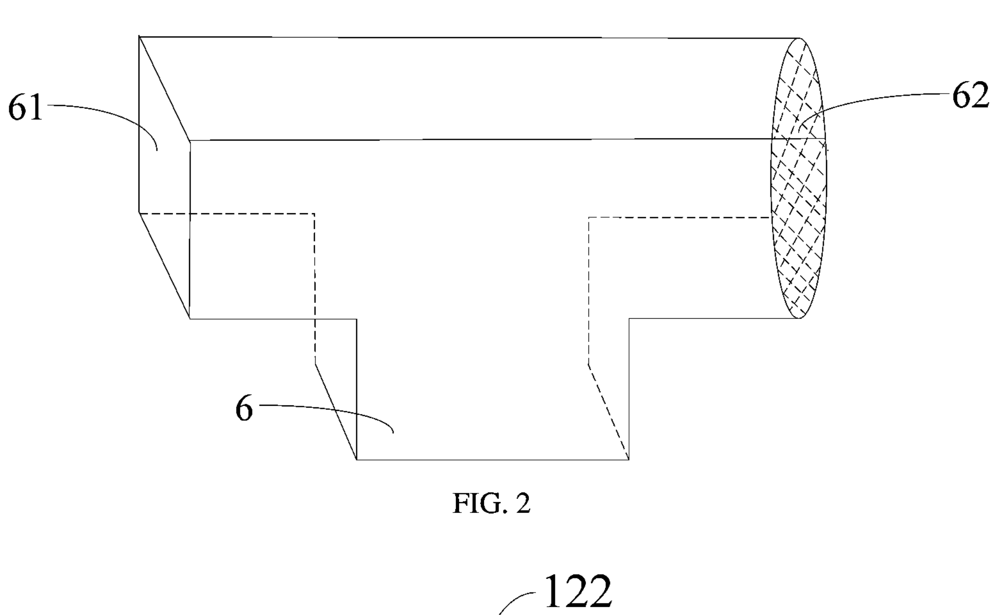
FIG. 2 is a schematic structural diagram of a collection box of the jujube harvesting apparatus with adjustable suction vector in one embodiment of the present disclosure.

Optionally, as shown in FIGS. 1 and 2, the jujube harvesting apparatus further includes a collection box 6, the collection box 6 is T-shaped and has a first connection port 61 and a second connection port 62. The first connection port 61 and the second connection port 62 are respectively arranged on two sides of the collection box 6. The first connection port 61 of the collection box 6 is connected to the air duct outlet, and the second connection port 62 is connected and communicated with the wind power device.

Optionally, as shown in FIG. 1, the wind power device includes an air compressor 21, the air compressor 21 is connected to the second connection port 62 and communicated with the collection box 6. The air compressor 21 is used to generate wind power for the jujubes sequentially passing through the suction pipe 11, the adapter 12, and the air duct 13 and entering the collection box 6.

Optionally, as shown in FIG. 1, the wind power device further includes a filter screen 22, the filter screen 22 is arranged at the first connection port 61 of the air compressor 21, or the filter screen 22 is arranged at the air duct outlet. In the embodiment, by arranging the filter screen 22, jujubes can be prevented from entering the air compressor 21, so as to avoid affecting the normal operation of the air compressor 21.

Optionally, as shown in FIG. 1, the ionization device includes a discharge electrode assembly 31 and a power supply assembly 32. The discharge electrode assembly 31 is arranged on the air duct 13, and the power supply assembly 32 is connected to the discharge electrode assembly 31.

Optionally, as shown in FIG. 1, an upper surface of the air duct 13 is arranged with a first ionization region (not shown in drawings), and a lower surface of the air duct 13 is arranged with a second ionization region (not shown in drawings). The first ionization region and the second ionization region are oppositely arranged. The discharge electrode assembly 31 includes a plurality of positive electrodes and a plurality of negative electrodes, the positive electrodes and the negative electrodes have a rectangular sheet structure. The plurality of the positive electrodes are arranged on the first ionization region, and the plurality of the negative electrodes are arranged on the second ionization region and are arranged in parallel and symmetrically with the positive electrodes. The power supply assembly 32 includes a plurality of high-voltage nanosecond pulse power supplies for supplying electric energy to the positive electrodes and the negative electrodes. Among them, the quantity of the high-voltage nanosecond pulse power supplies corresponds to the positive electrodes and the negative electrodes respectively. As shown in FIG. 1, a plurality of groups of discharge electrodes including a negative electrode and a positive electrode are connected in parallel, and each group corresponds to one high-voltage nanosecond pulse power supply, and each positive electrode and each negative electrode are respectively connected with the positive pole and the negative pole of the corresponding high-voltage nanosecond pulse power supply.

Optionally, materials of the first ionization region and the second ionization region are non-conductive materials, and their physical properties are not affected by the magnetic field.

It is worth noting that gas ionization generally requires high temperature conditions. In the embodiment, the electric field is excited by manual ionization. Because the temperature of the gas in the air duct 13 is not high and belongs to low temperature gas ionization, so the unbalanced ionization method is used, that is, the gas in the air duct 13 is ionized by external ionization technology such as charged particles or electromagnetic radiation.

The technical principle of the ionization device is as follows: after the high-voltage nanosecond pulse power supply is turned on, the discharge electrode assembly 31 releases voltage, and the gas in the air duct 13 begins to be ionized to generate plasma (charged ions), and the plasma movement generates current, thus generating an electric field inside the air duct 13. By changing the gas ionization conditions at different positions inside the air duct 13, the effect of controlling the electric field inside the air duct 13 can be achieved.

As shown in FIG. 1, the magnetic field generating device includes a first strip-shaped permanent magnet 41 and a second strip-shaped permanent magnet 42, among them, both the first strip-shaped permanent magnet 41 and the second strip-shaped permanent magnet 42 have two poles, namely, South pole (S pole) and North pole (N pole). In the embodiment, a strong magnetic field environment is constructed by the first strip-shaped permanent magnet 41 and the second strip-shaped permanent magnet 42. Among them, the first strip-shaped permanent magnet 41 is arranged on the left side of the air duct 13 and the second strip-shaped permanent magnet 42 is arranged on the right side of the air duct 13. The two poles (N pole and S pole) of the first strip-shaped permanent magnet 41 and the second strip-shaped permanent magnet 42 are oppositely arranged, and the first strip-shaped permanent magnet 41 and the second strip-shaped permanent magnet 42 interact to generate a magnetic field, as shown in FIG. 4.

Optionally, as shown in FIG. 1, the two moving assemblies include a first guide rail 511, a second guide rail 512, a first servo motor 513, and a second servo motor 514. The first guide rail 511 is arranged on the air duct 13 by a first connector (not shown in drawings) and is located on the left side of the ionization device, and the first servo motor 513 is arranged on the first guide rail 511. The second guide rail 512 is arranged on the air duct 13 by a second connector (not shown in drawings) and located on the right side of the ionization device. The first guide rail 511 and the second guide rail 512 are arranged in parallel, and the second servo motor 514 is arranged on the second guide rail 512. It is worth noting that the servo motor has high precision, fast response speed, good stability, and good position accuracy control effect, so in the embodiment, the servo motor is selected, and the first strip-shaped permanent magnet 41 and the second strip-shaped permanent magnet 42 are respectively controlled to approach or move away from each other respectively by the servo motor 513 and the second servo motor 514, so as to meet the accuracy requirements of the suction vector adjusting device for controlling the magnetic field strength.

Optionally, as shown in FIG. 1, the two rotating assemblies include a first rotating table (not shown in drawings) and a second rotating table (not shown in drawings). The first rotating table is arranged on the driving end of the first servo motor 513 and slidably arranged on the first guide rail

511 by the driving end of the first servo motor 513. The first strip-shaped permanent magnet 41 is arranged on the driving end of the first rotating table. The second rotating table is arranged on the driving end of the second servo motor 514 and is slidably arranged on the second guide rail 512 by the driving end of the second servo motor 514. The second strip-shaped permanent magnet 42 is arranged on the second rotating table. The first guide rail 511 and the second guide rail 512 are both plastic guide rails and non-magnetic. The first guide rail 511 and the second guide rail 512 are used for bearing the first servo motor 513 and the second servo motor 514, respectively, and providing tracks for the movement of the first servo motor 513 and the second servo motor 514. The first rotating table, the second rotating table, the first servo motor 513, and the second servo motor 514 are respectively connected with a single-phase AC power supply (not shown in drawings).

Furthermore, as shown in FIG. 1, the two rotating assemblies further include a first tray 521 and a second tray 522. The first tray 521 is fixedly arranged on the driving end of the first rotating table, and the first strip-shaped permanent magnet 41 is arranged on the first tray 521. The second tray 522 is fixedly arranged on the driving end of the second rotating table, and the second strip-shaped permanent magnet 42 is arranged on the second tray 522.

That is to say, in a first aspect, in the embodiment, the first rotating table is driven to slide on the first guide rail 511 by controlling the driving of the first servo motor 513, and then the first tray 521 and the first strip-shaped permanent magnet 41 on the driving end of the first rotating table are driven to slide on the first guide rail 511. Meanwhile, the second rotating table is driven to slide on the second guide rail 512 by controlling the driving of the second servo motor 514, and then the second tray 522 and the second strip-shaped permanent magnet 42 on the driving end of the second rotating table are driven to slide on the second guide rail 512. The first strip-shaped permanent magnet 41 and the second strip-shaped permanent magnet 42 are driven to approach or move away from each other by the driving of the first servo motor 513 and the second servo motor 514, thereby adjusting the magnetic field intensity. In a second aspect, in the embodiment, the first tray 521 and the first bar-shaped permanent magnet 41 are driven to rotate by controlling the driving of the first rotating table, and the second tray 522 and the second strip-shaped permanent magnet 42 are driven to rotate by controlling the driving of the second rotating table. That is, the first strip-shaped permanent magnet 41 and the second strip-shaped permanent magnet 42 are driven to rotate by the driving of the first rotating table and the second rotating table, thus changing the direction of the magnetic field between the first strip-shaped permanent magnet 41 and the second strip-shaped permanent magnet 42, that is, realizing the commutation of the N poles and S poles of the first permanent magnet and the second permanent magnet.

Optionally, as shown in FIG. 5, the electromagnetic sensor assembly 53 includes a plurality of conductivity sensors 531 and a plurality of magnetic field strength sensors 532. The plurality of conductivity sensors 531 are sequentially arranged on an inner left side wall of the air duct 13 at intervals and used for detecting electric field parameters inside the air duct 13. Among them, the conductivity sensors 531 are arranged at intervals of 1 m. The plurality of the magnetic field intensity sensors 532 are sequentially arranged at intervals on the inner left side wall of the air duct 13 located in the ionization device, and are located below the conductivity sensor 531. The magnetic field intensity sensors 532 are arranged at intervals of 1 m and are used for detecting the magnetic field parameters inside the air duct 13. The control module includes a physical information neural network, as shown in FIG. 6. The physical information neural network is respectively connected with the conductivity sensor 531 and the magnetic field strength sensor 532. The conductivity sensor 531 transmits the detected electric field parameters inside the air duct 13 to the physical information neural network, and the magnetic field strength sensor 532 transmits the detected magnetic field parameters inside the air duct 13 to the physical information neural network.

The working principle of the jujube harvesting apparatus with adjustable suction vector in the embodiment is as follows:

From the above, it can be seen that the suction of jujube suffered in the air duct is mainly related to the wind power of the air compressor and the ampere force under the joint action of the ionization device and the magnetic field generating device. The wind power value of the air compressor is artificially regulated, which can be adjusted according to the actual demand. The ampere force is mainly related to the size and distribution of the current and the magnetic field intensity in the air duct, in which the current can be expressed by conductivity, that is, $$I = \frac{U}{R} = U\sigma$$

(I represents current, U represents voltage, R represents resistance, σ represents conductivity). Because the current in the air duct is not easy to measure, the conductivity is selected as the measurement physical parameter according to the above formula. Therefore, the physical parameters to be detected in the air duct are the conductivity σ after gas ionization and the magnetic field intensity in the air duct after the magnetic field is applied.

For these two physical parameters, the conductivity sensors and the magnetic field intensity sensors are arranged to complete the detection and transmission of the two physical parameters. The physical information neural network combines the jujube harvesting efficiency and the jujube integrity to comprehensively calculate and analyze the conductivity transmitted by the conductivity sensor and the magnetic field intensity transmitted by the magnetic field intensity sensor, so as to determine the optimal electromagnetic field distribution in the air duct, thus determining the displacement data of the moving assembly and the rotation data of the rotating assembly. Specifically, by controlling the control module, the first servo motor, the second servo motor, the first rotating table, and the second rotating table are respectively controlled to move according to their corresponding displacement data and rotation data, so as to finally make the magnetic pole directions of the first strip-shaped permanent magnet and the second strip-shaped permanent magnet optimal; and by starting the high-voltage nanosecond pulse power supply, the effect of gas ionization in the air duct is optimal, which finally makes the electromagnetic field distribution in the air duct optimal.

It is worth noting that in the face of the complex multi-coupling situation of electric field, magnetic field, and flow field, the traditional proportional integral derivative (PID) control algorithm and fuzzy control algorithm are difficult to meet the actual needs, and it is difficult for the traditional control algorithm to deal with the complicated multi-physical field calculation and analysis. The physical information neural network, a more intelligent and powerful analytical method, is needed to replace it. Among them, the magnetic fluid movement in the air duct involves magnetohydrodynamics, Maxwell equations and Nassi Shneiderman (NS) equations, and a large number of partial differential equations need to be solved accurately. The physical information neural network adds the condition of physical equation as a constraint to the neural network to make the training result meet the physical law. By iterating the physical equation for many times and combining the difference value of iteration with the loss function, the satisfactory result is trained, which is suitable for solving complex partial differential equations.

In the embodiment, the control mechanism of the jujube harvesting apparatus with adjustable suction vector is a magnetic fluid vector control, and the basic control idea is: from a microscopic point of view, charged particles are generated after the gas in the air duct is ionized, and the charged particles are subjected to Lorentz force in a strong magnetic field. According to the Lorentz force formula: $f=q(E+vB)$ (q is the charge amount of charged particles, E is the electric field strength, v is the speed of charged particles, and B is the magnetic field strength). It is known that the Lorentz force of charged particles in the magnetic field is related to the charge amount, the electric field strength, the particle moving speed, and the magnetic field strength. The essence of controlling the moving speed and direction of charged particles is to control the four variables in the formula. Among them, controlling the intensity of electric field and the intensity of magnetic field is the easiest and most cost-effective control scheme. From a macro point of view, after the gas in the air duct is ionized, the charged particles in the gas move to form a current. According to the ampere force formula $F=BIL \sin \alpha$ (B is the magnetic field strength, I is the current size, L is the length of the pipeline, and $\alpha$ is the angle between the current direction and the magnetic field direction). It can be known that the ampere force on the current in the air duct is related to the magnetic field strength, the current size, the pipeline length, and the angle between the current direction and the magnetic field direction. Among them, the easiest and most reasonable control scheme is to control the values and directions of current and magnetic field intensity. Based on microscopic and macroscopic aspects, after the gas in the air duct is ionized, the ionization degree of different parts of the gas in the air duct is different, the plasma distribution in the air duct is different, the charged particles are subjected to different forces, and the gas flow rates at two ends of the air duct are different, which leads to the change of the final suction value and direction, thus realizing the vector control of the suction.

Figure 7:
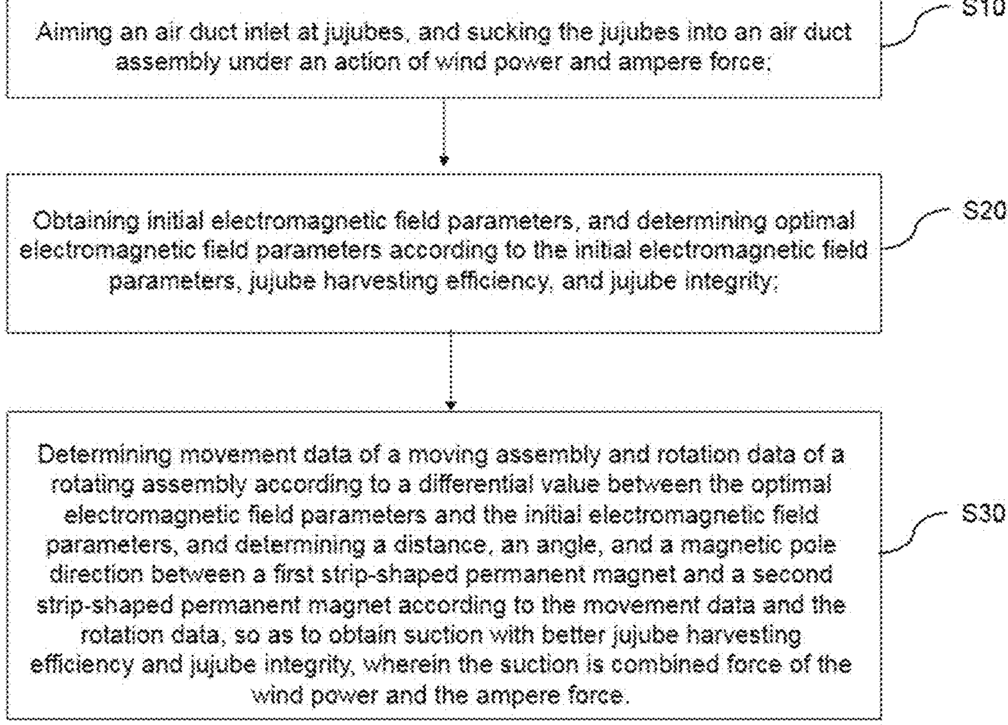
FIG. 7 is a flow chat diagram of a jujube harvesting method with adjustable suction vector.

As shown in FIG. 7, in a second aspect, the embodiment provides a jujube harvesting method with adjustable suction vector applied to the jujube harvesting apparatus with adjustable suction vector as described above, and the jujube harvesting method includes:

- S10, aiming an air duct inlet at jujubes, and sucking the jujubes into an air duct assembly under an action of wind power and ampere force;
- S20, obtaining initial electromagnetic field parameters, and determining optimal electromagnetic field parameters according to the initial electromagnetic field parameters, jujube harvesting efficiency, and jujube integrity;
- S30, determining movement data of a moving assembly and rotation data of a rotating assembly according to a differential value between the optimal electromagnetic field parameters and the initial electromagnetic field parameters, and determining a distance, an angle, and a magnetic pole direction between a first strip-shaped permanent magnet and a second strip-shaped permanent magnet according to the movement data and the rotation data, so as to obtain a suction force with better jujube harvesting efficiency and jujube integrity, and the suction is combined force of the wind power and the ampere force.

Among them, the initial electromagnetic field parameters are electric field parameters and magnetic field parameters detected by the electromagnetic sensor assembly.

In summary, the present disclosure provides a jujube harvesting apparatus with adjustable suction vector and method therefor. The apparatus includes an air duct assembly, a wind power device, an ionization device, a magnetic field generating device, and a suction vector adjusting device. the wind power device is arranged on one end of the air duct assembly deviating from an air duct inlet and is connected to the air duct assembly, and is used for generating wind power. The ionization device is arranged on the air duct assembly and positioned between the air duct inlet and the wind power device, and is used for ionizing air in the air duct assembly to generate plasma. The magnetic field generating device includes a first strip-shaped permanent magnet and a second strip-shaped permanent magnet. The suction vector adjusting device includes two moving assemblies, two rotating assemblies, an electromagnetic sensor component, and a control module. The two moving assemblies are respectively arranged on the air duct assembly and located at two sides of the ionization device. The two rotating assemblies are arranged at the driving end of the moving assembly and are slidably arranged on the moving assembly by driving force of the driving end of the moving assembly. The first strip-shaped permanent magnet and the second strip-shaped permanent magnet are respectively arranged on a driving end of the rotating assembly and are rotatably arranged on the rotating assembly by the driving end of the rotating assembly. The electromagnetic sensor assembly is used for acquiring electromagnetic field parameters and is arranged on an inner wall of the air duct assembly and located at the ionization device. The control module is respectively connected with the wind power device, the ionization device, the two moving assemblies, the two rotating assemblies, and the electromagnetic sensor assembly. In the present disclosure, the air inside the air duct assembly is ionized by the ionization device to generate a plasma plume flow, and the charged particles in the plasma plume flow move directionally to generate current. The magnetic field generating device controls the current to generate ampere force in the same direction or opposite direction to the wind or forming a certain angle with the wind direction inside the air duct assembly, and under the action of the suction force formed by the combined force of the wind power (generated by the wind power device) and the ampere force, the landing jujubes 7 are sucked into the air duct assembly. Meanwhile, the electromagnetic field parameters inside the air duct assembly are detected by the electromagnetic sensor assembly and transmitted into the control module. According to the current electromagnetic field parameters in combination with the jujube harvesting efficiency and the jujube integrity, the control module performs physical field coupling calculation to determine optimal electromagnetic field parameters. According to values of the optimal electromagnetic field parameters and values of the current electromagnetic field parameters detected by the current electromagnetic sensor assembly 53, displacement data of the moving assembly and rotation data of the rotating assembly are determined to adjust a distance, an angle and a magnetic pole direction between the first strip-shaped permanent magnet and the second strip-shaped permanent magnet, so as to change a distribution of magnetic induction lines and a magnitude and a direction of magnetic field intensity between the first strip-shaped permanent magnet and the second strip-shaped permanent magnet. Thereby a magnitude and direction of the ampere force is changed, that is, the magnitude and direction of the suction force (the resultant force of the ampere force and the wind power) is changed, and finally obtaining the suction force which can simultaneously ensure the jujube harvesting efficiency and the jujube integrity (or obtaining the best jujube harvesting efficiency on the premise of ensuring the jujube integrity). It should be understood that the components of the embodiment can be adjusted according to the environmental changes (wind power changes, etc.) in real time, so as to always obtain better electromagnetic field parameters, thus obtaining better suction vector.

It should be understood that the above are only better embodiments of the present disclosure and are not used to limit the present disclosure. Within the spirits and principles of the present disclosure, any modification, equivalent replacement, and improvement of the present disclosure should be included in the protection scope of the present disclosure.

What is claimed is:

1. A jujube harvesting apparatus with adjustable suction vector, comprising:

an air duct assembly, wherein one end of the air duct assembly comprises an air duct inlet;

a wind power device, wherein the wind power device is arranged on one end of the air duct assembly deviating from the air duct inlet and is connected to the air duct assembly, and the wind power device is used for generating wind power;

an ionization device, wherein the ionization device is arranged on the air duct assembly and positioned between the air duct inlet and the wind power device, and the ionization device is used for ionizing air in the air duct assembly to generate plasma;

a magnetic field generating device, wherein the magnetic field generating device comprises a first strip-shaped permanent magnet and a second strip-shaped permanent magnet; and a suction vector adjusting device, wherein the suction vector adjusting device comprises two moving assemblies, two rotating assemblies, an electromagnetic sensor component, and a control module, the two moving assemblies are respectively arranged on the air duct assembly and located at two sides of the ionization device, the two rotating assemblies are arranged at a driving end of the moving assembly and are slidably arranged on the moving assembly by driving force of the driving end of the moving assembly, the first strip-shaped permanent magnet and the second strip-shaped permanent magnet are respectively arranged on a driving end of the rotating assembly and are rotatably arranged on the rotating assembly by the driving end of the rotating assembly, the electromagnetic sensor assembly is used for acquiring electromagnetic field parameters and is arranged on an inner wall of the air duct assembly and located at the ionization device, and the control module is respectively connected with the wind power device, the ionization device, the two moving assemblies, the two rotating assemblies, and the electromagnetic sensor assembly.

2. The jujube harvesting apparatus with adjustable suction vector according to claim 1, further comprising a collection box, wherein the collection box is arranged on one end of the air duct assembly deviating from the air duct inlet and is connected to the air duct assembly, and the wind power device is arranged on one end of the collection box deviating from the air duct assembly and is connected to the collection box.

3. The jujube harvesting apparatus with adjustable suction vector according to claim 2, wherein the wind power device further comprises an air compressor and a filter screen, the air compressor is arranged on the one end of the collection box deviating from the air duct assembly and is connected to the collection box, and the filter screen is arranged between the air compressor and the collection box.

4. The jujube harvesting apparatus with adjustable suction vector according to claim 1, wherein the ionization device comprises a discharge electrode assembly and a power supply assembly, the discharge electrode assembly is arranged on the air duct assembly and is used for ionizing air in the air duct assembly to generate plasma, and the power supply assembly is connected to the discharge electrode assembly and is used for supplying electric energy to the discharge electrode assembly.

5. The jujube harvesting apparatus with adjustable suction vector according to claim 4, wherein a first ionization region is arranged on an upper surface of the air duct and a second ionization region is arranged on a lower surface of the air duct, the discharge electrode assembly comprises a plurality of positive electrodes and a plurality of negative electrodes, the plurality of the positive electrodes are arranged on the first ionization region, the plurality of the negative electrodes are arranged on the second ionization region and are arranged in parallel and symmetrically with the positive electrodes, the power supply assembly comprises a plurality of high-voltage nanosecond pulse power supplies, and the positive electrodes and the negative electrodes are respectively connected with positive poles and negative poles of the corresponding high-voltage nanosecond pulse power supply.

6. The jujube harvesting apparatus with adjustable suction vector according to claim 1, wherein the two moving assemblies comprise a first guide rail, a second guide rail, a first servo motor, and a second servo motor, the first guide rail is arranged on the air duct assembly and is located on one side of the ionization device, the first servo motor is arranged on the first guide rail, the first strip-shaped permanent magnet is arranged on a driving end of the first servo motor, the second guide rail is arranged on the air duct assembly and is located on another side of the ionization device, the first guide rail and the second guide rail are arranged in parallel, the second servo motor is arranged on the second guide rail, and the second strip-shaped permanent magnet is arranged on a driving end of the second servo motor.

7. The jujube harvesting apparatus with adjustable suction vector according to claim 6, wherein the two rotating assemblies comprise a first rotating table and a second rotating table, the first rotating table is arranged on the driving end of the first servo motor and slidably arranged on the first guide rail by the driving end of the first servo motor, the first strip-shaped permanent magnet is arranged on a driving end of the first rotating table, the second rotating table is arranged on the driving end of the second servo motor and is slidably arranged on the second guide rail by the driving end of the second servo motor, and the second strip-shaped permanent magnet is arranged on the second rotating table.

8. The jujube harvesting apparatus with adjustable suction vector according to claim 7, wherein the two rotating assemblies further comprise a first tray and a second tray, the first tray is fixedly arranged on the driving end of the first rotating table, the first strip-shaped permanent magnet is arranged on the first tray, the second tray is fixedly arranged on the driving end of the second rotating table, and the second strip-shaped permanent magnet is arranged on the second tray.

9. The jujube harvesting apparatus with adjustable suction vector according to claim 1, wherein the electromagnetic sensor assembly comprises a plurality of conductivity sensors and a plurality of magnetic field strength sensors, the plurality of conductivity sensors are sequentially arranged on an inner side wall of the air duct assembly located at the ionization device at intervals and are used for detecting electric field parameters inside the air duct assembly, the plurality of the magnetic field intensity sensors are sequentially arranged on the inner side wall of the air duct assembly located in the ionization device at intervals and are located below the conductivity sensor, and the magnetic field intensity sensors are used for detecting magnetic field parameters inside the air duct assembly.

10. A jujube harvesting method with adjustable suction vector, wherein the method is applied to the jujube harvesting apparatus with adjustable suction vector according to claim 1, and the method comprises:

aiming an air duct inlet at jujubes and sucking the jujubes into an air duct assembly under an action of wind power and ampere force;

obtaining initial electromagnetic field parameters and determining optimal electromagnetic field parameters according to the initial electromagnetic field parameters, jujube harvesting efficiency, and jujube integrity; and determining movement data of a moving assembly and rotation data of a rotating assembly according to a differential value between the optimal electromagnetic field parameters and the initial electromagnetic field parameters, and determining a distance, an angle, and a magnetic pole direction between a first strip-shaped permanent magnet and a second strip-shaped permanent magnet according to the movement data and the rotation data, so as to obtain suction with better jujube harvesting efficiency and jujube integrity, wherein the suction is combined force of the wind power and the ampere force.

* * * * *